(12) United States Patent
Burdeniuc et al.

(10) Patent No.: US 10,144,811 B2
(45) Date of Patent: Dec. 4, 2018

(54) POLYURETHANE FOAM PRODUCTION PROCESS, PRE-MIX FORMULATION, AND PRODUCT

(75) Inventors: Juan Jesus Burdeniuc, Colmar, PA (US); Boxun Leng, Shanghai (CN); Torsten Panitzsch, Henstedt-Ulzburg (DE); Stephan Hermann Wendel, Oldenburg (DE); Renee Jo Keller, Orwigsburg, PA (US)

(73) Assignee: Evonik Degussa GmbH, Essen (DE)

( * ) Notice: Subject to any disclaimer, the term of this patent is extended or adjusted under 35 U.S.C. 154(b) by 197 days.

(21) Appl. No.: 14/387,986

(22) PCT Filed: Mar. 30, 2012

(86) PCT No.: PCT/CN2012/073339
§ 371 (c)(1),
(2), (4) Date: Sep. 25, 2014

(87) PCT Pub. No.: WO2013/143129
PCT Pub. Date: Oct. 3, 2013

(65) Prior Publication Data
US 2015/0148438 A1 May 28, 2015

(51) Int. Cl.
| | | |
|---|---|---|
| *C08J 9/00* | (2006.01) | |
| *C08G 18/76* | (2006.01) | |
| *C08G 18/18* | (2006.01) | |
| *C08G 18/28* | (2006.01) | |
| *C08G 18/40* | (2006.01) | |
| *C08J 9/14* | (2006.01) | |
| *C08G 18/16* | (2006.01) | |
| *C08G 18/24* | (2006.01) | |
| *C08G 101/00* | (2006.01) | |

(52) U.S. Cl.
CPC .......... *C08J 9/0019* (2013.01); *C08G 18/163* (2013.01); *C08G 18/1833* (2013.01); *C08G 18/1875* (2013.01); *C08G 18/246* (2013.01); *C08G 18/2885* (2013.01); *C08G 18/4009* (2013.01); *C08G 18/4072* (2013.01); *C08G 18/7621* (2013.01); *C08J 9/142* (2013.01); *C08G 2101/0008* (2013.01); *C08G 2101/0016* (2013.01); *C08J 2375/04* (2013.01)

(58) Field of Classification Search
CPC .............. C08G 18/163; C08G 18/1833; C08G 18/1875; C08G 18/246; C08G 18/2885; C08G 18/4009; C08G 18/4072; C08G 18/7621; C08G 2101/0008; C08G 2101/0016; C08J 9/0019; C08J 9/142; C08J 2375/04

See application file for complete search history.

(56) References Cited

U.S. PATENT DOCUMENTS

| | | | |
|---|---|---|---|
| 3,891,579 | A | 6/1975 | Cenker et al. |
| 4,007,140 | A | 2/1977 | Ibbotson |
| 4,338,408 | A | 7/1982 | Zimmerman et al. |
| 4,394,491 | A | 7/1983 | Hoffman |
| 4,433,170 | A | 2/1984 | Zimmerman et al. |
| 5,508,314 | A | 4/1996 | Listemann et al. |
| 5,559,161 | A | 9/1996 | Klotz et al. |
| 5,633,293 | A | 5/1997 | Van Court Carr et al. |
| 5,688,834 | A * | 11/1997 | Parker .................... A61K 49/18 252/182.2 |
| 5,859,079 | A | 1/1999 | Mercando et al. |
| 6,114,403 | A | 9/2000 | Mercando et al. |
| 6,201,033 | B1 | 3/2001 | Mercando et al. |
| 6,232,356 | B1 | 5/2001 | Mercando et al. |
| 6,432,864 | B1 | 8/2002 | Wendel et al. |
| 6,525,107 | B1 | 2/2003 | Wendel et al. |
| 6,858,654 | B1 | 2/2005 | Wendel et al. |
| 7,615,580 | B2 | 11/2009 | Burdeniuc et al. |
| 7,666,919 | B2 | 2/2010 | Burdeniuc et al. |

FOREIGN PATENT DOCUMENTS

| | | |
|---|---|---|
| CN | 101885829 A | 11/2010 |
| GB | 2191208 A | 12/1987 |
| JP | 05105811 A | 4/1993 |
| JP | 08020624 | 1/1996 |
| WO | 0158976 A1 | 8/2001 |
| WO | 03016372 A1 | 2/2003 |
| WO | 03016373 A1 | 2/2003 |
| WO | 03055930 A1 | 7/2003 |
| WO | 2004060956 A1 | 7/2004 |
| WO | 2004113410 A1 | 12/2004 |
| WO | 2006116456 A1 | 11/2006 |

* cited by examiner

*Primary Examiner* — John M Cooney
(74) *Attorney, Agent, or Firm* — Andrew H. Chung; Linda S. Li; Jason S. Ngui

(57) ABSTRACT

Disclosed are a process of producing a polyurethane foam product, a polyurethane foam product pre-mix, polyurethane foam product formulation, and a polyurethane foam product. The process of producing the polyurethane foam product includes contacting a halohydrin component with a polyurethane foam product pre-mix. The polyurethane foam product pre-mix includes the halohydrin component. The polyurethane foam product formulation includes a polyol component, an isocyanate component, and a halohydrin component. The polyurethane foam product is formed by the pre-mix having the halohydrin component.

20 Claims, 1 Drawing Sheet

POLYURETHANE FOAM PRODUCTION PROCESS, PRE-MIX FORMULATION, AND PRODUCT

BACKGROUND OF THE INVENTION

The present invention is directed to materials and processes of producing materials. More specifically, the present invention is directed to polyurethane foams and pre-mixes and processes of producing polyurethane foams and pre-mixes.

Polyurethane foams are used in a variety of products. Such products are present in the automotive industry, the housing industry, other building and manufacturing industries, and elsewhere. Many of such known polyurethane foam products are produced by reacting a polyisocyanate with a polyol in the presence of additives.

One such additive is chlorofluorocarbon, commonly known as CFC. CFC is used as a blowing agent which vaporizes as a result of a reaction exotherm causing a polymerizing mass to form into foam. CFCs suffer from a drawback that they deplete ozone in the stratosphere, thus creating environmental concerns.

Use of water as a blowing agent involves generation of $CO_2$ from the reaction of the water and the polyisocyanate. Due to the environmental hazard of using CFC, use of water as the blowing agent has becoming more prevalent. However, use of water as the blowing agent presents additional challenges.

Tertiary amine catalysts are known to be used to accelerate blowing when the blowing agent is water. The tertiary amine catalysts selectively promote the blowing or gelling in the production of the polyurethane foam product. If too much of the blowing tertiary amine catalyst is included in the process, then $CO_2$ will bubble out of the polyurethane foam product and the structure of the polyurethane foam product will collapse, for example, resulting in broken or poorly defined cell structure.

Use of tertiary amine catalysts in forming polyurethane foam products has also been undesirable due to the hazards of tertiary amines. Tertiary amines are malodorous and highly volatile. In addition, they can have safety and toxicity concerns. Thus, it is desirable for little or no emission of tertiary amines to occur when used. To achieve this, known tertiary amine catalysts can include isocyanate-reactive groups which are capable of immobilizing the amine catalysts in a polyurethane polymer. However, the resulting products can have undesirable properties, such as substantially degrading under accelerated ageing with hot humidity. Alternatively, using low vapor-pressure, high-molecular weight amine catalysts can require usage of high amounts of catalyst, thereby being cost prohibitive in manufacturing processes.

Several known processes include use of additives to produce polyurethane products. For example, U.S. Pat. No. 4,007,140, which is hereby incorporated by reference in its entirety, discloses N,N'-bis(3-dimethylaminopropyl)urea as a low odor catalyst. U.S. Pat. Nos. 4,338,408 and 4,433,170, which are each incorporated by reference in their entirety, disclose additives structurally related to bis(dimethylamino) ethyl ether as a blowing catalyst. U.S. Pat. Nos. 5,508,314, 5,559,161, and 5,633,293, which are each incorporated by reference in their entirety, disclose an additive having a high amount of amine catalysts containing secondary alcohols to balance promotion of active hydrogen-isocyanate reactions and reaction of isocyanates with the additive. The additives disclosed in the above-referenced patents do not improve humid aged properties.

U.S. Pat. No. 5,859,079, which is hereby incorporated by reference in its entirety, discloses an additive with N,N'-bis (3-dimethylaminopropyl)urea and 3-dimethylaminopropylurea at a predetermined ratio to control flowability, air-flow, and force to crush properties of the polyurethane product. U.S. Pat. No. 6,114,403, which is hereby incorporated by reference in its entirety, discloses an additive with N,N'bis (3-dimethylaminopropyl)urea and 3-dimethylaminopropylurea at a predetermined ratio to control flowability and percent of open cell content for rigid polyurethane foam products. The additives disclosed in the above-referenced patents do not improve humid aged properties.

Known additives are used for producing water-blown flexible polyurethane foam products. U.S. Pat. No. 6,201, 033, which is hereby incorporated by reference in its entirety, discloses an additive that includes tertiary amino alkyl urea and/or bis(tertiary amino alkyl)urea in combination with either a tertiary amine gelling catalyst or a tertiary amine blowing catalyst. U.S. Pat. No. 6,232,356, which is hereby incorporated by reference in its entirety, discloses an additive that includes tertiary amino alkyl urea and/or bis (tertiary amino alkyl)urea in combination with either a gelling catalyst or a blowing catalyst to improve physical properties of the produced product. The additives disclosed in the above-referenced patents do not improve humid aged properties.

U.S. Pat. No. 6,858,654, which is hereby incorporated by reference in its entirety, discloses additives for catalyzing a polyurethane foaming reaction that includes a gelling catalyst and a blowing catalysts selected such that the resulting polyurethane foam product has a low level of volatile and/or malodorous material. The identified additives are tertiary aminoalkyl substituted primary or secondary amines, bis (aminoalkyl)ethers having aklanol moieties, primary amine moieties, or unreido moieties derived from primary amine moieties. The additives disclosed in the above-referenced patent do not improve humid aged properties.

WO/2004/113,410, which is hereby incorporated by reference in its entirety, discloses an additive containing a quaternary ammonium alkoxide moiety and a partially or totally neutralized tertiary amine group with an acid compound. The additive disclosed in WO/2004/113,410 does not improve humid aged properties.

U.S. Pat. Nos. 7,666,919 and 7,615,580, which are each incorporated by reference in their entirety disclose methods involving an additive with a non-emissive catalyst in the presence of an ester alcohol or carbamate to increase humid aged deterioration properties. The additive is used at a high concentration (for example, greater than 1.0 parts per one hundred parts polyol, commonly referred to as pphp) to produce polyurethane with the properties, thereby being cost-prohibitive. In general, the additive disclosed in the above-referenced patents and the other above-described additives suffer from the drawback of being unable to produce polyurethane foam products having desirable performance properties for humid aged conditions in an economical manner.

A polyurethane foam production process, pre-mix, formulation, and product that do not suffer from one or more of the above drawbacks would be desirable in the art.

BRIEF SUMMARY OF THE INVENTION

In an exemplary embodiment, a process of producing a polyurethane foam product includes contacting a halohydrin component with a polyurethane foam product pre-mix.

In another exemplary embodiment, a polyurethane foam product pre-mix includes a halohydrin component.

In another exemplary embodiment, a polyurethane foam product formulation includes a polyol component, an isocyanate component, and a halohydrin component.

In another exemplary embodiment, a polyurethane foam product is formed by a pre-mix having a halohydrin component.

In another exemplary embodiment, a composition comprising at least one halohydrin, at least one silicone surfactant and at least one glycol carrier.

Other features and advantages of the present invention will be apparent from the following more detailed description of the preferred embodiment, taken in conjunction with the accompanying drawings which illustrate, by way of example, the principles of the invention.

BRIEF DESCRIPTION OF SEVERAL VIEWS OF THE DRAWINGS

Wherever possible, the same reference numbers will be used throughout the drawings to represent the same parts.

DETAILED DESCRIPTION OF THE INVENTION

Figure 1:
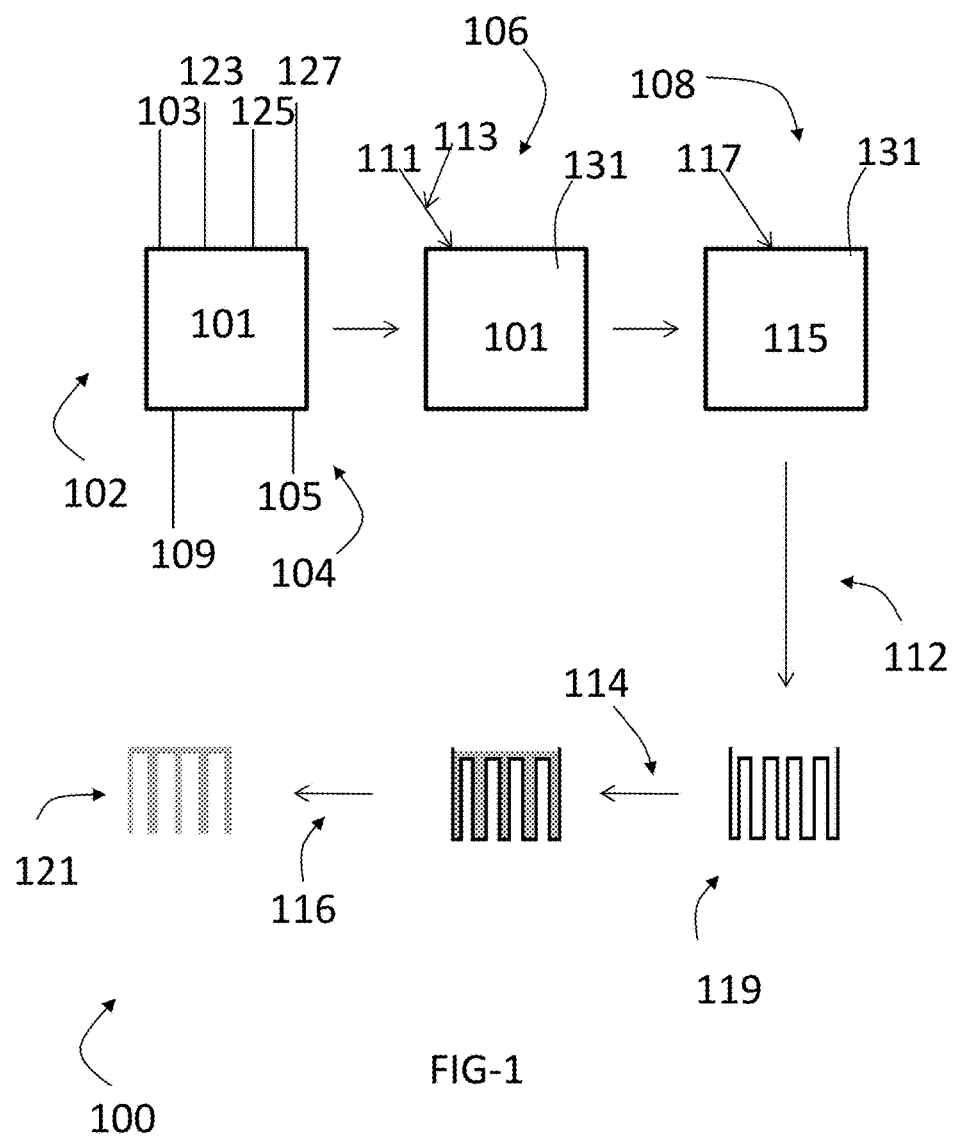
FIG. 1 is a schematic view of an exemplary process according to the disclosure.

Provided is an exemplary polyurethane foam production process, pre-mix, formulation, and product. Embodiments of the present disclosure permit manufacturers of polyurethane foam products to use more toluene diisocyanate in flex-molded foam products made with non-emissive amine catalysts, permit manufacturers to improve product properties without changing processing facilities, utilize chemicals that are relatively easy to handle, permit desirable physical properties under ambient and humid aged conditions, or a combination thereof.

Referring to FIG. 1, in one embodiment, a process 100 of producing a composition includes providing a pre-mix 101 (step 102). The pre-mix 101 includes a polyol component 109, a surfactant component 123, a blowing agent component 125, a crosslinking component 127, or a combination thereof. In one embodiment, the pre-mix 101 includes a solvent (for example, if used for reacting a solid or semi-solid product) or the polyol component 109 without the solvent (for example, if used for reacting a liquid product—in all cases the final product is a solid foamed polymer). In one embodiment, the invention comprises the use of the chlorohydrins in the presence of tertiary amine catalyst blocked with different acids in order to yield delay action catalysts. By delay action catalysts it is meant that the catalysts will not be substantially active on the initial stages of the polymerization process thereby allowing for the polymerizing mass to freely flow and completely fill a mold.

The polyol component 109 includes a polyether polyol and a copolymer polyol. In one embodiment, the pre-mix 101 includes about 50 parts per one hundred parts polyol (pphp) of a first polyol (for example, the polyether polyol) in the polyol component 109, about 50 pphp of a second polyol (for example, the copolymer polyol) in the polyol component 109, about 3.0 pphp to about 3.5 pphp water in the blowing component 125, about 0.60 pphp surfactant (for example, a silicon surfactant) in the surfactant component 123, about 0.70 pphp crosslinking agent (for example, diethanolamine) in the crosslinking component 127, or a combination thereof. In one embodiment, the polyol component 109 includes polyols for making a semi-rigid or semi-flexible product, such as in instrument panels and/or interior trims, for example, of an automobile.

Other suitable polyols that can be used according to the invention include natural oil polyols or polyols obtained from renewable natural resources such as vegetable oils. Polyols useful in the preparation of polyurethane foam from inexpensive and renewable resources are desirable to minimize the depletion of fossil fuel and other non-sustainable resources. Natural oils consist of triglycerides of saturated and unsaturated fatty acids. One natural oil polyol suitable for use as a polyol according to the invention includes castor oil, which is a natural triglyceride of ricinoleic acid. Other natural oils need to be chemically modified to introduce sufficient hydroxyl content to make them useful in the production of polyurethane polymers. There are two chemically reactive sites that can be considered when attempting to modify natural oil or fat into a useful polyol: 1) the unsaturated sites (double bonds); 2) the ester functionality. Unsaturated sites present in oil or fat can be hydroxylated via epoxidation followed by ring opening or hydroformylation followed by hydrogenation. Alternatively, trans-esterification can also be utilized to introduce OH groups in natural oil and fat.

The chemical process for the preparation of natural polyols using epoxidation route involves a reaction mixture that requires epoxidized natural oil, a ring opening acid catalyst and a ring opener. Epoxidized natural oils include epoxidized plant-based oils (epoxidized vegetable oils) and epoxidized animal fats. The epoxidized natural oils may be fully or partially epoxidized and these oils include soybean oil, corn oil, sunflower oil, olive oil, canola oil, sesame oil, palm oil, rapeseed oil, tung oil, cotton seed oil, safflower oil, peanut oil, linseed oil and combinations thereof. Animal fats for epoxidation may include fish, tallow and lard. These natural oils are triglycerides of fatty acids which may be saturated or unsaturated with various chain lengths from C12 to C24. These acids can be, for example, 1) saturated, such as, lauric, myristic, palmitic, steric, arachidic or lignoceric acid; 2) mono-unsaturated, such as, palmitoleic or oleic acid, or 3) poly-unsaturated, such as, linoleic, linolenic, or arachidonic acid. Partially or fully epoxidized natural oil may be prepared when reacting peroxyacid under suitable reaction conditions. Examples of peroxyacids utilized in the epoxidation of oils have been described in WO 2006/116456 A1, which is incorporated by reference in its entirety. Ring opening of the epoxidized oils with alcohols, water and other compounds having one or multiple nucleophilic groups can also be accomplished. Depending on the reaction conditions oligomerization of the epoxidized oil can also occur. Ring opening yields natural oil polyol that can be used for the manufacture of polyurethane products. In the hydroformylation/hydrogenation process, the oil is hydroformylated in a reactor filled with a hydrogen/carbon monoxide mixture in the presence of a suitable catalyst (typically cobalt or rhodium) to form an aldehyde which is hydrogenated in the presence of cobalt or nickel catalyst to form a polyol. Alternatively, natural oil and fat polyols can be produced by trans-esterification with a suitable poly-hydroxyl containing substance using an alkali metal or alkali earth metal base or salt as a trans-esterification catalyst. Natural oil or, alternatively, any partially hydrogenated oil can be used in the transesterification process. Examples of oils include, but are not limited to, soybean, corn, cottonseed, peanut, castor, sunflower, canola, rapeseed, safflower, fish, seal, palm, tung, olive oil or any combination thereof. Multifunctional hydroxyl compounds can also be used such as lactose, maltose, raffinose, sucrose, sorbitol, xylitol, erythritol, mannitol, or any combination thereof.

Useful polyester polyols include those produced when a dicarboxylic acid is reacted with an excess of a diol. For example, adipic acid, phathalic acid, or phthalic anhydride can be reacted with ethylene glycol or butanediol to form a polyester polyol. Alternatively, a lactone can be reacted with an excess of a diol, such as the reaction of caprolactone with propylene glycol.

One embodiment of the invention provides the use of the halohydrin of the invention in the presence of tertiary amine catalyst blocked with different acids to yield delay action catalysts. Such catalysts are expected to yield a delay action which can be of advantage in flexible molded polyurethane foam. When making flexible polyurethane foam, carboxylic acids are normally added to the polyurethane formulation to inhibit the catalytic activity of the tertiary amine and prevent a relatively fast increase in viscosity which allows for a more efficient mold-filling operation particularly in cases where molds with complex shapes and geometries are needed. This approach allows filling of small cavities and voids minimizing the number of defective articles. Acids most commonly used for this purpose are monoacids such as acetic acid, propionic acid, butanoic acid, hexanoic acid, 2-ethylhexanoic acid and the like and mixtures thereof. Other acids commonly used in applications that require emissions minimizations include carboxylic acids containing functional groups able to react with isocyanate to render the carboxylic acid immobilized in the polyurethane polymer. Examples of such acids include glycolic acid, gluconic acid or any other acids containing isocyanate reactive groups. Also carboxylic diacids, triacids and polyacids can also be used. Such acids include malonic, maleic, succinic, glutaric, adipic, pimelic, suberic, azelaic, sebacic, phthalic, isophthalic and therephthalic. Other acids include those disclosed in U.S. Pat. No. 6,432,864 and U.S. Pat. No. 6,525,107 (both hereby incorporated by reference), for the preparation of polyurethane foams. These acid-blocked amine catalysts are typically made by combining a tertiary amine with an acid prepared from an organic cyclic anhydride and a glycol. The amount of tertiary amine catalyst blocked with an acid can range from about 0.1 pphp to about 20 pphp of the foamable composition.

Suitable cell stabilizers (forming a portion or all of the surfactant component 123) include, but are not limited to, silicon surfactants, anionic surfactants, or a combination thereof. In one embodiment, the cell stabilizer is devoid of any acyl group and is the silicon surfactant, such as, polyalkylsiloxane, polyoxyalkylene polyol-modified dimethylpolysiloxane, alkylene glycol-modified dimethylpolysiloxane, or a combination thereof. In one embodiment, the silicon surfactant includes an acyl group. In one embodiment, the cell stabilizer is the anionic surfactant, such as, a salt of a fatty acid, a salt of a sulfuric acid ester, a salt of a phosphoric acid ester, a salt of a sulfonic acid, or a combination thereof. In one embodiment, the pre-mix 101 and/or the polyurethane composition 115 include the cell stabilizers at a suitable predetermined amount. Suitable predetermined amounts include, but are not limited to, about 0.1 pphp to about 20 pphp, 0.1 pphp to about 10 pphp, 0.1 pphp to about 5 pphp, or any suitable combination, sub-combination, range, or sub-range within.

Suitable crosslinking agents (forming a portion of or all of the crosslinking component 127) include, but are not limited to, low-molecular weight compounds containing at least two moieties, such as, hydroxyl groups, primary amino groups, secondary amino groups, other active hydrogen-containing groups that are reactive with an isocyanate group, or a combination thereof. In one embodiment, the crosslinking agent is a polyhydric alcohol (for example, a trihydric alcohol, such as, glycerol or trimethylolpropane), a polyamine, or a combination thereof. In one embodiment with the crosslinking agent being a polyamine, the crosslinking agent is diethyltoluenediamine, chlorodiaminobenzene, diethanolamine, diisopropanolamine, triethanolamine, tripropanolamine, 1,6-hexanediamine, or a combination thereof. In one embodiment with the crosslinking agent being a diamine, the crosslinking agent includes twelve or fewer carbon atoms, seven carbon atoms, or less than seven carbon atoms. In one embodiment, blending the crosslinking agent(s), such as a low molecular weight crosslinker, with the polyol component builds hardness and promotes faster demolding. In one embodiment, the amount and/or concentration of the crosslinking agent(s) is increased or decreased, thereby respectively increasing or decreasing hardness. The amount of crosslinking agents typically ranges from about 0.10 pphp to about 20 pphp of the foamable composition.

In one embodiment, the pre-mix 101 further includes chain extenders, pigments, fillers, flame retardants, auxiliary urethane gelling catalysts, auxiliary urethane blowing catalysts (for example, bis-dimethylaminoethyl ether) in addition to the blowing component 125 (for example, at about 0.12 pphp), transition metal catalysts, or a combination thereof. As is further described below, in some embodiments, the pre-mix 101 includes further components that are added through any suitable procedures and/or at any suitable portion of the process 100, for example, as part of the pre-mix 101.

Suitable chain extenders include, but are not limited to, compounds having a hydroxyl or amino functional group, such as, glycols, amines, diols, water, or a combination thereof. In one embodiment, the chain extender is ethylene glycol, diethylene glycol, propylene glycol, dipropylene glycol, 1,4-butanediol, 1,3-butanediol, 1,5-pentanediol, neopentyl glycol, 1,6-hexanediol, 1,10-decanediol, 1,12-dodecanediol, ethoxylated hydroquinone, 1,4-cyclohexanediol, N-methylethanolamine, N-methylisopropanolamine, 4-aminocyclohexanol, 1,2-diaminoethane, 2,4-toluenediamine, or a combination thereof. The amount of chain extenders typically ranges from about 0.10 pphp to about 20 pphp of the foamable composition.

Suitable pigments include, but are not limited to, organic pigments, inorganic pigments, or a combination thereof. The pigments permit coloring (for example, to match a color grade), concealing (for example, to conceal yellowing), or a combination thereof. In one embodiment with the pigment being an organic pigment, the pigment is an azo/diazo dye, a phthalocyanine, dioxazine, carbon black, or a combination thereof. In one embodiment with the pigment being an inorganic pigment, the pigment is titanium dioxide, iron oxide, chromium oxide, or a combination thereof. The amount of pigments typically ranges from about 0.01 pphp to about 20 pphp of the foamable composition.

Suitable fillers increase the density and load bearing properties of polyurethane foams. In one embodiment, the filler is barium sulfate, calcium carbonate, or a combination thereof. The amount of filler typically can range from about 0 pphp to about 20 pphp of the foamable composition.

Suitable flame retardants reduce the flammability of polyurethane foams. In one embodiment, the flame retardant is a chlorinated phosphate ester, a chlorinated paraffin, a melamine powder, or a combination thereof. In one embodiment, the pre-mix 101 and/or a polyurethane composition 115 include the flame retardants at a suitable amount.

Suitable amounts include, but are not limited to, about 0 pphp to about 20 pphp, about 0 pphp to about 10 pphp, about 0 pphp to about 5 pphp, about 1 pphp to about 20 pphp, about 1 pphp to about 10 pphp, about 1 pphp to about 5 pphp, or any suitable combination, sub-combination, range, or sub-range within.

Referring again to FIG. 1, the process 100 includes directly or indirectly contacting a halohydrin component 105 with the pre-mix 101 (step 104). The contacting (step 104) of the halohydrin component 105 with all or a portion of the pre-mix 101 is by any suitable procedure. In one embodiment, the halohydrin component 105 and the rest of the pre-mix 101 are blended for a predetermined duration with a predetermined mixer (for example, a mechanical mixer 131), at a predetermined blade rotation speed (for example, about 6000 revolutions per minute), or a combination thereof.

In one embodiment, the process 100 continues by mixing a tertiary amine catalyst component 113 into a catalyst composition 111 and then into the pre-mix 101 (step 106). The mixing (step 106) is for a predetermined duration (for example, about 10 seconds), at a predetermined blade rotation speed (for example, about 6,000 revolutions per minute), or a combination thereof. In other embodiments, the tertiary amine catalyst component 113 is not included and the catalyst composition 111 is devoid of any tertiary amine. In one embodiment, the halohydrin component 105 is mixed with the catalyst composition 111 in addition to or alternative to the contacting (step 104) with the pre-mix 101 prior to the catalyst composition 111 being added.

The halohydrin component 105 is or includes any suitable compound containing at least one halogen atom (for example, F, Cl, Br, I, etc.) and at least one hydroxyl group (—OH). Suitable compounds include, but are not limited to, 3-chloro-1-propanol, 6-chloro-1-hexanol, 2-(2-chloroethoxy) ethanol, 2,3-dichloropropanol, 2,2-dichloroethanol, 1-chloro-2-propanol, 3-bromo-1-propanol, chlorobutanol, ethylene chlorhydrin, 1-chloro-5-pentanol, 1-chloro-2,3-propanediol, or a combination thereof. In one embodiment, the amount of the halohydrin component 105 contacted with the pre-mix 101 and/or the type of compound included or being the halohydrin component 105 is/are selected to desired physical properties in a produced polyurethane foam product 121. For example, in one embodiment, halohydrin in the halohydrin component 105 of the pre-mix 101 is at an amount of about 0.15 pphp, about 0.3 pphp, about 0.5 pphp, about 0.75 pphp, about 1.0 pphp, between about 0.5 pphp and about 1.0 pphp, between about 0.15 pphp and about 0.3 pphp, between about 0.3 pphp and about 0.5 pphp, between about 0.5 pphp and about 0.75 pphp, between about 0.75 pphp and about 1.0 pphp, less than about 1.0 pphp, less than about 0.5 pphp, greater than about 0.15 pphp, greater than about 0.3 pphp, greater than about 0.5 pphp, or any suitable combination, sub-combination, range, or sub-range within.

In one embodiment, the halohydrin in the halohydrin component 105 forms a predetermined amount of the pre-mix 101 and/or the polyurethane composition 115. In one embodiment, the predetermined amount is less than about 5 wt %, less than about 4 wt %, less than about 3 wt %, less than about 2 wt %, less than about 1 wt %, between about 1 wt % and about 5 wt %, between about 1 wt % and about 4 wt %, between about 1 wt % and about 3 wt %, between about 1 wt % and about 2 wt %, between about 2 wt % and about 5 wt %, between about 2 wt % and about 4 wt %, between about 2 wt % and about 3 wt %, or any suitable combination, sub-combination, range, or sub-range within. In one embodiment, the halohydrin component 105 provides mechanical integrity and/or performance after accelerated humid ageing. For example, in one embodiment, the amount of the halohydrin component 105 and/or the amount of the halohydrin within the halohydrin component 105 is sufficient to provide improved physical properties but low enough to avoid detrimental damage, such as, polymer chain termination in a polyurethane polymer. In one embodiment, the product 121 includes a predetermined percent chlorine from the halohydrin compound 105 of about 61%, about 55% by weight, about 26% by weight or less than about 26% by weight.

Referring again to FIG. 1, in one embodiment, the process 100 continues with the formation of the polyurethane composition 115 (step 108). The polyurethane composition 115 is formed (step 108) by combining an isocyanate component 117 with the pre-mix 101. The combining is for a predetermined duration (for example, about 6 seconds), at a predetermined blade rotation speed (for example, about 6,000 revolutions per minute), or a combination thereof.

In one embodiment, the amount of the isocyanate component 117 mixed with the pre-mix 101 to form the polyurethane composition 115 is based upon an NCO index. The NCO index is the number of equivalents of the isocyanate, divided by the total number of equivalents of active hydrogen, multiplied by 100 (for example, based upon an NCO index being [NCO/(OH+NH)]*100). The polyurethane composition 115 includes the NCO index being within a predetermined range. In one embodiment, the predetermined range is between about 70 and about 500. In one embodiment, when the polyurethane composition 115 is used for producing flexible foams, the range is between about 70 and about 115.

The isocyanate component 117 includes any suitable organic isocyanate compound. Suitable organic isocyanate compounds include, but are not limited to, hexamethylene diisocyanate (HDI), phenylene diisocyanate (PDI), toluene diisocyanate (TDI), 4,4'-diphenylmethane diisocyanate (MDI), isophoronedi-isocyanate (IPDI), or a combination thereof. In one embodiment, the isocyanate component 117 includes 2,4-TDI, 2,6-TDI, or a combination thereof. In one embodiment, the isocyanate component 117 includes crude MDI, such as, a mixture of about 60% 4,4'-MDI and/or a stoichiometric amount along with other isomeric and analogous higher polyisocyanates. Other suitable isocyanates includes those isocyanates shown and described in U.S. Pat. No. 4,394,491, which is hereby incorporated by reference in its entirety.

A base polyol in the polyol component 109 reacts with the isocyanate 117 to produce the polyurethane composition 115. Suitable base polyols are shown and described in WO 03/016373 A1, WO 01/58976 A1, WO 04/060956 A1, WO 03/016372 A1, and WO 03/055930 A1, each of which are hereby incorporated by reference in their entirety. Suitable base polyols include, but are not limited to, the polyether polyols. In one embodiment, the polyether polyols are poly(alkylene oxide) polymers, such as, poly(ethylene oxide), poly(propylene oxide), and/or copolymers with terminal hydroxyl groups derived from polyhydric compounds (for example, diols and triols). In one embodiment, the base polyol is or includes triols having a molecular weight between about 4,500 and about 6,000 and/or diols having a molecular weight between about 2,000 and about 4,000. In one embodiment, the diols and triols utilized are ethylene glycol, propylene glycol, 1,3-butanediol, 1,4-butanediol, 1,6-hexanediol, neopentyl glycol, diethylene glycol, dipropylene glycol, pentaerythritol, glycerol, diglycerol, trimethylol propane, other suitable low molecular weight polyols, or a combination thereof. In one embodiment, the base polyol is or includes polyhydroxy-terminated acetal resin, hydroxy-terminated amine, hydroxyl-terminated polyamine, or a combination thereof. In one embodiment, the base polyol is or includes polyalkylene carbonate-based polyols, phosphate-based polyols, or a combination thereof. The amount of polyol typically can range from about 20 pphp to about 100 pphp (one single polyol) of the foamable composition.

In one embodiment, the base polyol is a single high molecular weight polyether polyol. In another embodiment, the base polyol is a mixture of high molecular weight polyether polyols, each having a different molecular weight or different chemical composition. In this embodiment, the base polyol includes di-functional and tri-functional materials, such as, but not limited to, polyethylene glycol, polypropylene glycol, glycerol-based polyether triols, trimethylolpropane-based polyether triols, other similar ester-free compounds or mixtures, or a combination thereof. In one embodiment, the base polyol is end-capped with ethylene oxide (for example, at greater than about 75% primary hydroxyl groups) with a capping range between about 10% and about 20%. In one embodiment, the base polyol includes an ester-free polyol component at a concentration, by weight, of at least about 50%, the ester-free polyol component including one or more polyether polyols.

Additionally or alternatively, in one embodiment, the polyol component 109 includes copolymer polyols. The copolymer polyols form, by weight, up to about 20% of the total polyol content (the total polyol content being based upon the amount of the base polyol, the copolymer polyol, and any other polyols in the polyurethane composition 115). The copolymer polyols improve polyurethane foam formed by the polyurethane composition 115 by increasing resistance to deformation of the polyurethane foam, thereby increasing load-bearing properties of a polyurethane foam formed by the polyurethane composition 115. In one embodiment, the copolymer polyol is or includes a graft polyol, a polyurea-modified polyol, or a combination thereof.

The graft polyol is any suitable graft polyol. In one embodiment, the graft polyol is prepared by copolymerizing vinyl monomers (for example, styrene and acrylonitrile) with a suitable starting polyol. In one embodiment, the starting polyol is or includes glycerol-initiated triol, end-capped with ethylene oxide (for example, at about 80% to about 85% primary hydroxyl groups). In this embodiment, the graft polyol includes copolymer grafted to the starting polyol, homopolymers of the vinyl monomers, and the starting polyol (unaltered). In one embodiment, the graft polymer includes the styrene or acrylonitrile at a concentration, by weight, between about 5% and about 45%.

In one embodiment, the polyurea-modified polyol is formed by the reaction of a diamine and a diisocyanate in the presence of the starting polyol. In this embodiment, the polyurea-odified polyol includes polyurea dispersion. In one embodiment, the polyurea modified-polyol is or includes polyisocyanate poly addition (PIPA) polyols, for example, formed in situ from a reaction of the isocyanate 117 and an alkanolamine in the starting polyol.

Referring again to FIG. 1, in one embodiment, the process 100 continues with the polyurethane composition 115 being poured (step 112), for example, by pouring it into a pre-heated mold 119. In one embodiment, the pre-heated mold 119 is at a predetermined temperature (for example, about 70° C., between about 61° C. and about 65° C., between about 61° C. and about 55° C. or any suitable combination, sub-combination, range, or sub-range within), the polyurethane composition 115 remains in the pre-heated mold 119 for a predetermined duration (for example, at least about 4 minutes), or a combination thereof.

In one embodiment, the process 100 continues with the polyurethane composition 115 being cured (step 114). Among other things, the curing (step 114) of the polyurethane composition 115 is dependent upon the components of the pre-mix 101, the catalyst composition 111, and/or the tertiary amine catalyst component 113.

The tertiary amine catalyst component 113 is or includes a single tertiary amine catalyst or a combination of tertiary amine catalysts. The tertiary amine catalyst component 113 is a non-fugitive tertiary amine catalyst. In one embodiment, the tertiary amine catalyst component 113 is at a predetermined amount, such as, between about 0.1 pphp and about 20 pphp, between about 0.1 pphp and about 10 pphp, between about 0.1 pphp and about 5 pphp, between about 0.1 pphp and about 0.5 pphp, greater than about 0.5 pphp, at about 0.4 pphp, or any suitable combination, sub-combination, range, or sub-range within.

The tertiary amine catalyst component 113 includes or does not include an isocyanate reactive group. In one embodiment, the tertiary amine catalyst component 113 is or includes N,N-bis(3-dimethylaminopropyl)-N-isopropanolamine, N,N-dimethylaminoethyl-N'-methyl ethanolamine, N,N,N'-trimethylaminopropyl ethanolamine, N,N-dimethylethanolamine, N,N-diethylethanolamine N,N-dimethyl-N',N'-2-hydroxy(propyl)-1,3-propylenediamine, dimethylaminopropylamine, (N,N-dimethylaminoethoxy) ethanol, methyl-hydroxy-ethyl-piperazine, bis(N,N-dimethyl-3-aminopropyl)amine, N,N-dimethylaminopropyl urea, diethylaminopropyl urea N,N'-bis(3-dimethylaminopropyl)urea, N,N'-bis(3-diethylaminopropyl)urea; bis(dimethylamino)-2-propanol, 6-dimethylamio-1-hexanol, N-(3-aminopropyl)imidazole), N-(2-hydroxypropyl)imidazole, and N-(2-hydroxyethyl) imidazole, or a combination thereof. Additionally or alternatively, in one embodiment, the tertiary amine catalyst component 113 is or includes the blowing catalyst component 125. For example, in one embodiment, the tertiary amine catalyst component 113 is or includes 2-[N-(dimethylaminoethoxyethyl)-N-methylamino]ethanol, N,N-dimethylaminoethyl-N'-methyl-N'-ethanol, dimethylaminoethoxyethanol, N,N,N'-trimethyl-N'-3-aminopropyl-bis(aminoethyl) ether, or a combination thereof.

In one embodiment, the tertiary amine catalyst component 113 is highly volatile and is not isocyanate-reactive. For example, in one embodiment, the tertiary amine catalyst component 113 is a volatile gelling catalyst and is or includes diazobicyclooctane (triethylenediamine), 1,8-diazabicycloundec-7-ene, tris(dimethylaminopropyl) amine, dimethylaminocyclohexylamine, bis(dimethylaminopropyl)-N-methylamine, or a combination thereof. Additionally or alternatively, in one embodiment, the tertiary amine catalyst component 113 is or includes a volatile blowing catalyst and is or includes bis-dimethylaminoethyl ether, pentamethyldiethylenetriamine, hexamethyltriethylenetramine, heptamethyltetraethylenepentamine and related compositions, higher permethylated polyamines, 2-[N-(dimethylaminoethoxyethyl)-N-methylamino]ethanol and related structures, alkoxylated polyamines, imidazole-boron compositions, amino propyl-bis(amino-ethyl) ether compositions, or a combination thereof.

In one embodiment, the tertiary amine catalyst component 113 is used in conjunction with a transition metal catalyst. For example, in one embodiment, the tertiary amine catalyst component 113 is used with a metal complex component 103, such as, an organotin compound. In one embodiment, the organotin compound includes dibutylin dilaureate, dimethyltin dilaureate, dimethyltin diacetate, dibutyltin diacetate, dimethyltin dilaurylmercaptide, dibutyltin dilaurylmercaptide, dimethyltin diisooctylmaleate, dibutyltin diisooctylmaleate, dimethyltin bi(2-thylhexyl mercaptacetate), dibutyltin bi(2-thylhexyl mercaptacetate), stannous octate, other suitable organotin catalysts, or a combination thereof. Other metals can also be included, such as, for example, bismuth (Bi).

In one embodiment, the tertiary amine catalyst component 113 is used in with a metal complex component 103, such as a bismuth carboxylate salt. Suitable bismuth carboxylate salts useful with as the metal complex component 103 may includes salts of pentanoic acid, neopentanoic acid, hexanoic acid, 2-ethylhexyl carboxylic acid, neohexanoic acid, octanoic acid, neooctanoic acid, heptanoic acid, neoheptanoic acid, nonanoic acid, neononanoic acid, decanoic acid, neodecanoic acid, undecanoic acid, neoundecanoic acid, dodecanoic acid, neododecanoic acid, and other suitable carboxylic acids. Other salts of transition metals of lead (Pb), iron (Fe), zinc (Zn) with pentanoic acid, neopentanoic acid, hexanoic acid, 2-ethylhexyl carboxylic acid, octanoic acid, neooctanoic acid, neoheptanoic acid, neodecanoic acid, neoundecanoic acid, neododecanoic acid, and other suitable carboxylic acids may also be included.

Referring again to FIG. 1, in one embodiment, the process 100 continues with the polyurethane composition 115 being removed from the pre-heated mold 119 as the product 121 (step 116), such as, a flexible foam (for example, as in automobile interiors).

Using the process 100 to form the product 121 permits the product 121 to have properties not previously available. In one embodiment, the properties of the product 121 formed from the polyurethane composition 115 are impacted by including the blowing agent component 125 in the polyurethane composition 115. The blowing agent component 125 forms cells in a polyurethane matrix of the product 121 by having low boiling points and being vaporized during the exothermic polymerization reaction. In one embodiment, the blowing agent component 125 is inert and does not decompose or react during the polymerization reaction. The blowing agent component 125 includes any suitable blowing agent. Suitable blowing agents include, but are not limited to, carbon dioxide, chlorofluorocarbons, hydrogenated fluorocarbons, hydrogenated chlorofluorocarbons, fluoroolefins, chlorofluoroolefins, hydrofluoroolefins, hydrochlorofluoro olefins, acetone, low-boiling hydrocarbons (for example, cyclopentane, isopentane, n-pentane, or a combination thereof), or a combination thereof. Other suitable blowing agents include, but are not limited to, compounds that react with isocyanate compounds to produce a gas (for example, water). In one embodiment, the pre-mix 101 and/or the polyurethane composition 115 include the blowing agent at a suitable amount. Suitable amounts include, but are not limited to, about 0 (water-blown) to about 80 pphp, about 0 (water-blown) to about 60 pphp (for example, with a very low density foam), about 1.0 pphp to about 10 pphp, about 2.0 pphp to about 5 pphp, or any suitable combination, sub-combination, range, or sub-range within. In embodiments that are water-blown, the isocyanate component 117 reacts, thereby forming carbon dioxide.

In one embodiment, the polyurethane foam product 121 includes desirable ambient physical and/or humid aged physical properties. For example, in one embodiment, the product 121 includes such properties that meet or exceed a predetermined standard corresponding with these properties. The product 121 includes physical properties (not humid aged) of tensile strength, a 50% compression set, and percent elongation.

In one embodiment, the tensile strength of the product 121 is between about 150 kPa and about 225 kPa, between about 155 kPa and about 222 kPa, greater than about 80 kPa, greater than about 100 kPa, greater than about 120 kPa, greater than about 150 kPa, greater than about 155 kPa, greater than about 160 kPa, greater than about 165 kPa, greater than about 170 kPa, greater than about 175 kPa, greater than about 180 kPa, greater than about 185 kPa, greater than about 190 kPa, greater than about 195 kPa, greater than about 200 kPa, greater than about 205 kPa, greater than about 210 kPa, greater than about 215 kPa, greater than about 220 kPa, at about 157 kPa, at about 158 kPa, at about 159 kPa, at about 162 kPa, at about 167 kPa, at about 178 kPa, at about 200 kPa, at about 221 kPa, or any suitable combination, sub-combination, range, or sub-range within.

In one embodiment, the 50% compression set of the product 121 is between about 14 and about 16, between about 15 and about 16, between about 14 and about 15, less than about 17, less than about 16, at about 14.1, at about 16.0, at about 15.5, or any suitable combination, sub-combination, range, or sub-range within.

In one embodiment, the elongation of the product 121 is between about 100% and about 170%, between about 100% and about 120%, between about 120% and about 150%, between about 150% and about 170%, greater than about 100%, greater than about 120%, greater than about 140%, greater than about 160%, at about 102.2%, at about 111.2%, at about 124.7%, at about 128.8%, at about 147.91%, at about 150.9%, at about 153.3%, at about 162.1%, or any suitable combination, sub-combination, range, or sub-range within.

In one embodiment, the predetermined standard includes humid aged tensile strength being greater than 80 kPa, humid aged elongation being greater than 80%, and humid aged compression set below 18. In one embodiment, one or more of the elements of this predetermined standard is present. In one embodiment, the product 121 includes humid aged physical properties of humid aged tensile strength, humid aged elongation, and a 50% humid aged compression set.

In one embodiment, the humid aged tensile strength of the product 121 is greater than about 28 kPa, greater than about 65 kPa, greater than about 80 kPa, greater than about 90 kPa, greater than about 100 kPa, greater than about 110 kPa, greater than about 120 kPa, greater than about 130 kPa, greater than about 140 kPa, greater than about 150 kPa, greater than about 160 kPa, greater than about 165 kPa, between about 80 kPa and about 170 kPa, between about 100 kPa and about 170 kPa, between about 120 kPa and about 170 kPa, between about 140 kPa and about 170 kPa, at about 28.1 kPa, at about 65.4 kPa, at about 80 kPa, at about 100 kPa, at about 117 kPa, at about 118.9 kPa, at about 137 kPa, at about 164.1 kPa, at about 169.9 kPa, or any suitable combination, sub-combination, range, or sub-range within.

In one embodiment, the humid aged elongation of the product 121 is greater than about 20%, greater than about 70%, greater than about 80%, greater than about 90%, greater than about 100%, greater than about 110%, greater than about 120%, greater than about 130%, greater than about 150%, between about 80% and about 160%, between about 100% and about 160%, between about 120% and about 160%, at about 127%, at about 93%, at about 112%, at about 136%, at about 72.1%, at about 109.8%, at about 153.5%, at about 24.1%, at about 109.8%, at about 122.6%, at about 132.0%, or any suitable combination, sub-combination, range, or sub-range within.

In one embodiment, the 50% humid aged compression set of the product 121 is below about 30, below about 20, below about 18, below about 15, below about 12, below about 10, below about 9, between about 8 and about 18, between about 8 and about 15, between about 8 and about 12, between about 8 and about 10, between about 8 and about 9, at about 8.3, at about 8.9, at about 10.1, at about 11, at about 12, at about 15, at about 15.6, at about 28.6, or any suitable combination, sub-combination, range, or sub-range within.

Example 1

In a first example, foam pads were prepared by adding a tertiary amine catalyst to 302 grams of a pre-mix in a 32-ounce paper cup and mixed at about 6,000 revolutions per minute for about 10 seconds. The pre-mix included about 50 pphp of a polyether polyol, about 50 pphp of a copolymer polyol, about 3.5 pphp water, about 0.70 pphp silicon surfactant, about 0.15 pphp to about 0.3 pphp gelling catalyst (for example, DABCO® NE1080, from Air Products and Chemicals, Inc. of Allentown, Pa.), about 0.30 pphp blowing catalyst (for example, DABCO® NE300, (N,N,N'-trimethyl-N'-aminopropyl-bis(aminoethyl) ether, from Air Products and Chemicals, Inc. of Allentown, Pa.), about 0.05 pphp metal complex component 103 (for example, dimethyltin dilaureate), and about 1.0 pphp crosslinker (for example, diethanolamine).

Toluene diisocyanate was then added to the pre-mix with an NCO index of about 100 to form a polyurethane composition. The polyurethane composition was mixed for about 6 seconds at about 6,000 revolutions per minute using the same stirrer. Then, the polyurethane composition was poured into a pre-heated mold at about 70° C. After about 4 minutes, the cured product was removed from the pre-heated mold as foam pads.

The foam pads were hand crushed, weighed, and machine crushed to about 75% of their original thickness. The foam pads were stored under substantially constant temperature and humidity conditions for about 48 hours prior to cutting and testing.

The physical testing of the foam pads showed a tensile strength of about 217 kPa, an elongation of about 142.2%, and a 50% compression set of about 12.4. Humid aged physical properties of each of the foams were also tested and showed a humid aged load loss of about −20%, a humid aged tensile strength of about 65.4 kPa, a humid aged elongation of about 72.1%, and a 50% humid aged compression set of about 15.6. The results showed extensive deterioration as evidenced by the humid aged tensile strength being below a desired level of greater than 80 kPa, the humid aged elongation being below a desired level of greater than 80%, the humid aged load loss being on the lower end of a desired range between −30% and +10%, and the humid aged compression set being close to the maximum acceptable level of 18%.

Example 2

In a second example, a halohydrin was included in the pre-mix of Example 1 at an amount of about 1.0 pphp. Four separate samples were prepared with four different halohydrins: Example 2.1 was 2-(2-chloroethoxy) ethanol; Example 2.2 was 2,2-dichloroethanol, Example 2.3 was 2,3-dichloropropanol; Example 2.4 was 1-chloro-6-hexanol.

Toluene diisocyanate was then added to each of the pre-mixes with an NCO index of about 100 to form polyurethane compositions. The polyurethane compositions were mixed for about 6 seconds at about 6,000 revolutions per minute using the same stirrer. Then, the polyurethane compositions were poured into pre-heated molds at about 70° C. After about 4 minutes, the cured products were removed from the pre-heated molds as foam pads.

The foam pads were hand crushed, weighed, and machine crushed to about 75% of their original thickness. The foam pads were stored under substantially constant temperature and humidity conditions for about 48 hours prior to cutting and testing.

The foam pads for each of the samples were tested. The foam pads for Example 2.1 had a percent chlorine of about 28, a tensile strength of about 157 kPa, an elongation of about 150.9%, and a 50% compression set of about 14.0. Humid aged physical properties were also tested and showed a humid aged load loss of about 56%, a humid aged tensile strength of about 117 kPa, a humid aged elongation of about 127%, and a 50% humid aged compression set of about 11.

The foam pads for Example 2.2 had a percent chlorine of about 61, a tensile strength of about 178 kPa, an elongation of about 162.1%, and a 50% compression set of about 14.1. Humid aged physical properties were also tested and showed a humid aged load loss of about 36%, a humid aged tensile strength of about 80 kPa, a humid aged elongation of about 93%, and a 50% humid aged compression set of about 15.

The foam pads for Example 2.3 had a percent chlorine of about 55, a tensile strength of about 158 kPa, an elongation of about 147.9%, and a 50% compression set of about 16.0. Humid aged physical properties were also tested and showed a humid aged load loss of about 42%, a humid aged tensile strength of about 100 kPa, a humid aged elongation of about 112%, and a 50% humid aged compression set of about 12.

The foam pads for Example 2.4 had a percent chlorine of about 26, a tensile strength of about 167 kPa, an elongation of about 153.3%, and a 50% compression set of about 15.5. Humid aged physical properties were also tested and showed a humid aged load loss of about 48%, a humid aged tensile strength of about 137 kPa, a humid aged elongation of about 136%, and a 50% humid aged compression set of about 12.

The results showed that physical properties (not humid aged) were similar between all four of the samples as well as the sample in Example 1. However, humid aged testing showed a significant improvement in physical properties in samples containing the halohydrins in comparison to the sample in Example 1. Example 2.2 seemed to be the least effective, while Example 2.4 seemed to be the most effective under humid aged conditions. Of note, the percent chlorine in Example 2.4 is the lowest of the four samples.

Example 3

In a third example, a halohydrin was included in the pre-mix of Example 1 at an amount of about 0.5 pphp. The selected silicon surfactant was varied and the selected halohydrin was varied. Example 3.1 included 1-chloro-3-propanol as the halohydrin and the silicon surfactant included an acyl group (for example, as in polyalkylsiloxane, polyoxyalkylene, polyol-modified dimethylpolysiloxane, alkylene glycol-modified dimethylpolysiloxane, or a combination thereof). Example 3.2 included 1-chloro-6-hexanol as the halohydrin and the silicon surfactant included an acyl group. Example 3.3 included 2-(2-chloroethoxy) ethanol as the halohydrin and the silicon surfactant included acyl groups. Example 3.4 included 1-chloro-3-propanol as the halohydrin and the silicon surfactant did not include any acyl groups. Example 3.5 included 1-chloro-6-hexanol as the halohydrin and the silicon surfactant did not include any acyl groups. Example 3.6 included 2-(2-chloroethoxy) ethanol as the halohydrin and the silicon surfactant did not include any acyl groups.

The foam rise profile of each of the samples was monitored at room temperature (about 25° C.) for a period of 20 days. Each of the samples initially showed good foam rise properties. After 20 days, Example 3.1, Example 3.2, and Example 3.3 collapsed, while Example 3.4, Example 3.5, and Example 3.6 continued to show good foam rise properties.

Example 4

In a fourth example, a metal complex was analyzed as part of the pre-mix of Example 1. The selected amount/ratio of the metal complex was varied. Example 4.1 included dimethyltin dilaureate as the metal complex at an amount of about 0.05 pphp, with the gelling catalyst being at about 0.15 pphp, and the blowing catalyst being at about 0.30 pphp. Example 4.2 included 1-chloro-6-hexanol instead of the metal complex at an amount of about 1.0 pphp, with the gelling catalyst being at about 0.3 pphp, and the blowing catalyst being at about 0.30 pphp. Example 4.3 included dimethyltin dilaureate as the metal complex at an amount of about 0.05 pphp, with the gelling catalyst being at about 0.15 pphp, and the blowing catalyst being at about 0.30 pphp, and the 1-chorlo-6-hexanol being at an amount of about 1.0 pphp.

Toluene diisocyanate was then added to each of the pre-mixes with an NCO index of about 100 to form polyurethane compositions. The polyurethane compositions were mixed for about 6 seconds at about 6,000 revolutions per minute using the same stirrer. Then, the polyurethane compositions were poured into pre-heated molds at about 70° C. After about 4 minutes, the cured products were removed from the pre-heated molds as foam pads.

The foam pads were hand crushed, weighed, and machine crushed to about 75% of their original thickness. The foam pads were stored under substantially constant temperature and humidity conditions for about 48 hours prior to cutting and testing.

Humid aged physical properties for the foam pads of each of the samples were tested. The foam pads for Example 4.1 showed a humid aged tensile strength of about 65.4 kPa, a humid aged elongation of about 72.1%, and a 50% humid aged compression set of about 15.6. The foam pads for Example 4.2 showed a humid aged tensile strength of about 118.9 kPa, a humid aged elongation of about 109.8%, and a 50% humid aged compression set of about 10.1. The foam pads for Example 4.3 showed a humid aged tensile strength of about 169.9 kPa, a humid aged elongation of about 153.5%, and a 50% humid aged compression set of about 8.3.

The humid aged testing showed a significant improvement in physical properties in Example 4.3 containing the metal complex and the 1-chloro-6-hexanol. In addition, the humid aged testing showed that Example 4.1 and Example 4.2 were desirable by having humid aged tensile strength being above the desired level of greater than 80 kPa, humid aged elongation being above the desired level of greater than 80%, and humid aged compression set being below a desired maximum level of 18%.

Example 5

In a fifth example, A tertiary amine catalyst component was analyzed as part of the pre-mix of Example 1. The amount/ratio of the tertiary amine catalyst component was varied. A Example 5.1 uses gelling tertiary amine catalyst component DABCO®NE1080 and blowing tertiary amine catalyst DABCO®NE300 and was devoid of any halohydrin. Example 5.2 uses gelling tertiary amine catalyst component DABCO®NE1080 and blowing tertiary amine catalyst DABCO®NE300 and included a halohydrin at 1.0 pphp, specifically, 1-chloro-6-hexanol. Example 5.3 included diazobicyclooctane (triethylenediamine) as the tertiary amine catalyst component at an amount of about 0.4 pphp and an auxiliary blowing catalyst at about 0.12 pphp, specifically, bis-dimethylaminoethyl ether, but was devoid of any halohydrin. Example 5.4 included diazobicyclooctane (triethylenediamine) as the tertiary amine catalyst component at an amount of about 0.4 pphp and an auxiliary blowing catalyst at about 0.12 pphp, specifically, bis-dimethylaminoethyl ether, but included a halohydrin at 1.0 pphp, specifically 1-chloro-6-hexanol.

Toluene diisocyanate was then added to each of the pre-mixes with an NCO index of about 100 to form polyurethane compositions. The polyurethane compositions were mixed for about 6 seconds at about 6,000 revolutions per minute using the same stirrer. Then, the polyurethane compositions were poured into pre-heated molds at about 70° C. After about 4 minutes, the cured products were removed from the pre-heated molds as foam pads.

The foam pads were hand crushed, weighed, and machine crushed to about 75% of their original thickness. The foam pads were stored under substantially constant temperature and humidity conditions for about 48 hours prior to cutting and testing.

The foam pads for each of the samples were tested. The foam pads for Example 5.1 had a tensile strength of about 158.9 kPa and an elongation of about 102.2%. Humid aged physical properties were also tested and showed a humid aged tensile strength of about 28.1 kPa, a humid aged elongation of about 24.1%, and a 50% humid aged compression set of about 28.6.

The foam pads for Example 5.2 had a tensile strength of about 162.9 kPa and an elongation of about 111.2%. Humid aged physical properties were also tested and showed a humid aged tensile strength of about 118.9 kPa, a humid aged elongation of about 109.8%, and a 50% humid aged compression set of about 10.1.

The foam pads for Example 5.3 had a tensile strength of about 199.5 kPa and an elongation of about 124.7%. Humid aged physical properties were also tested and showed a humid aged tensile strength of about 118.9 kPa, a humid aged elongation of about 122.6%, and a 50% humid aged compression set of about 15.6.

The foam pads for Example 5.4 had a tensile strength of about 220.5 kPa and an elongation of about 128.8%. Humid aged physical properties were also tested and showed a humid aged tensile strength of about 164.1 kPa, a humid aged elongation of about 132.0%, and a 50% humid aged compression set of about 8.9.

Example 6

Foam Rate of Rise Kinetics in the Presence of Various Delay Additives.

Free rise foam rate of rise study was made by contacting the premix components shown in table below with toluene diisocyante at index 100. Different acids were added to about 108 g of the premix in a 32 oz (951 mL) paper cup. The formulation was mixed for about 10 seconds at about 6,000 RPM using an overhead stirrer fitted with a 2 in (5.1 cm) diameter stirring paddle.

Premix Components

| Component | PPHP |
| --- | --- |
| Polyether Polyol 1 | 50 |
| Polymer Polyol 2 | 50 |
| Water | 3.5 |
| SILICON SURFACTANT 1 | 0.70 |
| Catalyst 1 (Gelling) DABCO ®NE1080 | 0.15 |
| Catalyst 2 (Blowing) DABCO ®NE300 | 0.30 |
| Metal Catalyst (Dimethyltin dineodecanoate) DMTDND | 0.05 |
| 1-chloro-6-hexanol | 1.0 |
| Crosslinker (DEOA 100%) | 1.0 |
| Index (TDI) | 100 |

Toluene diisocyanate was added in an amount sufficient to produce foam with an NCO index of approximately 100. The formulation was mixed well for about 6 seconds at about 6,000 RPM using the same stirrer. The mixture was allowed to free rise and the foam height was recorded over time. String gel time was measured for mixtures containing different acids. DABCO®BA100 is a commercially available delay additive form Air Products & Chemicals. Adipic acid was dispensed to the mixture as a 31% solution in MP-diol.

| Delay additive (acid) | Amount (pphp) | String gel time (seconds) |
| --- | --- | --- |
| None | None | 38 |
| DABCO ® BA100 | 0.50 | 43 |
| DABCO ®BA100 | 1.20 | 52 |
| Acetic acid | 0.10 | 44 |
| Adipic acid | 0.10 | 56 |

This example illustrates that different acids can be used in the presence of 1-chloro-6-hexanol together with gelling catalysts (DABCO®NE1080 and dimethyltin di-neodecanoate) and blowing catalyst DABCO®NE300 to provide delay as evidenced by the longer string gel time when the premix contains a delay additive. Using delay additives as described above allow for better foam mass flow particularly in flexible molded application where filling space of complex mold is required.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A process of producing a flexible polyurethane foam product, the process comprising contacting a halohydrin component with a polyurethane foam product pre-mix;
   wherein the halohydrin component comprises a halohydrin compound selected from the group consisting of 3-chloro-1-propanol, 6-chloro-1-hexanol, 2-(2-chloroethoxy) ethanol, 1 chloro-2-propanol, 3-bromo-1-propanol, chlorobutanol, ethylene chlorhydrin, 1-chloro-5-pentanol, 1-chloro-2,3-propanediol, and combinations thereof;
   wherein the halohydrin component is present in an amount between about 0.5 pphp and about 1.0 pphp;
   wherein the polyurethane foam product pre-mix comprises a silicon surfactant that is devoid of acyl groups and a blowing agent consisting of water; and wherein the silicon surfactant is present in an amount of about 0.7 pphp to about 5 pphp.

2. The process of claim 1, wherein the polyurethane foam product pre-mix further comprises a non-fugitive tertiary amine catalyst composition.

3. The process of claim 1, wherein the process further comprises contacting the polyurethane foam product pre-mix and halohydrin component with an isocyanate component.

4. The process of claim 1, wherein the silicon surfactant is selected from the group consisting of polyalkylsiloxane, polyoxyalkylene, polyol-modified dimethylpolysiloxane, alkylene glycol-modified dimethylpolysiloxane, or a combination thereof.

5. The process of claim 1, wherein the polyurethane foam product pre-mix further comprises a metal complex.

6. The process of claim 5, wherein the metal complex comprises dimethyltin dilaureate.

7. The process of claim 1, wherein the polyurethane foam product pre-mix is devoid of any metal complex.

8. The process of claim 1, wherein the polyurethane foam product pre-mix further comprises a tertiary amine catalyst component.

9. The process of claim 8, wherein the tertiary amine catalyst component comprises diazobicyclooctane (triethylenediamine).

10. The process of claim 1, wherein the polyurethane foam product pre-mix is devoid of any tertiary amine catalyst components.

11. The process of claim 1, wherein the polyurethane foam product pre-mix further comprises an auxiliary blowing catalyst component.

12. The process of claim 11, wherein the auxiliary blowing catalyst component comprises bis-dimethylaminoethyl ether.

13. The process of claim 1 wherein the polyurethane foam product produced by the process has a humid aged tensile strength of greater than about 80 kPa.

14. The process of claim 1 wherein the polyurethane foam product produced by the process has a humid aged elongation of greater than about 80%.

15. The process of claim 1 wherein the polyurethane foam product produced by the process has a humid aged 50% compression set of less than about 18.

16. The process of claim 1 wherein the polyurethane foam product pre-mix further comprises
   a polyol component; and
   an isocyanate component.

17. The process of claim 1 wherein the halohydrin component comprises at least one halohydrin, and the polyurethane foam product pre-mix comprises at least one silicone surfactant and at least one glycol carrier.

18. The process of claim 17 wherein the polyurethane foam product pre-mix further comprises at least one tertiary amine catalyst blocked with at least one acid.

19. The process of claim 18 wherein the polyurethane foam product pre-mix further comprises at least one organic tin catalyst.

20. The process of claim 19 wherein the polyurethane foam product pre-mix further comprises at least one polyol and at least one crosslinker.

* * * * *